United States Patent
Nishimura et al.

[11] Patent Number: 5,874,519
[45] Date of Patent: Feb. 23, 1999

[54] PARA-ORIENTED AROMATIC POLYAMIDE SHAPED ARTICLES AND PREPARATION THEREOF

[75] Inventors: Satomi Nishimura; Hideo Kasatani, both of Nobeoka, Japan

[73] Assignee: Asahi Kasei Kogyo Kabushiki Kaisha, Osaka, Japan

[21] Appl. No.: 737,357

[22] PCT Filed: May 10, 1995

[86] PCT No.: PCT/JP95/00897

§ 371 Date: Feb. 3, 1997

§ 102(e) Date: Feb. 3, 1997

[87] PCT Pub. No.: WO95/31495

PCT Pub. Date: Nov. 23, 1995

[30] Foreign Application Priority Data

| May 11, 1994 | [JP] | Japan | ................................ 6-097573 |
| Sep. 14, 1994 | [JP] | Japan | ................................ 6-220027 |

[51] Int. Cl.$^6$ .................................................. C08G 73/10
[52] U.S. Cl. ......................... 528/310; 528/322; 528/332; 528/335; 528/336; 528/348; 428/357; 428/364; 428/395; 428/474.5; 264/184; 264/212; 264/216
[58] Field of Search ..................... 528/310, 322, 528/335, 336, 332, 348; 428/474.5, 357, 395, 364; 264/184, 212, 216

[56] References Cited

U.S. PATENT DOCUMENTS

| 3,767,756 | 10/1973 | Blades ..................................... 264/184 |
| 3,819,587 | 6/1974 | Kwoleck ................................. 528/310 |
| 3,869,429 | 3/1975 | Blades ..................................... 264/184 |
| 3,966,686 | 6/1976 | Asakura et al. .......................... 264/212 |
| 4,016,236 | 4/1977 | Nagasawa et al. ....................... 264/184 |
| 4,112,187 | 9/1978 | Asakura et al. ....................... 428/474.5 |
| 4,374,978 | 2/1983 | Fujiwara et al. . |
| 4,419,317 | 12/1983 | Fujiwara et al. ......................... 264/184 |
| 4,752,643 | 6/1988 | Imanishi et al. ......................... 264/216 |
| 4,857,255 | 8/1989 | Imanishi et al. ......................... 528/310 |

FOREIGN PATENT DOCUMENTS

| 0515680 | 12/1992 | European Pat. Off. . |
| 2460941 | 7/1975 | Germany . |
| 49-34595 | 3/1974 | Japan . |
| 53-133297 | 11/1978 | Japan . |
| 2-216212 | 8/1990 | Japan . |

OTHER PUBLICATIONS

Derwent Abstract No. 77–34937Y to Toray Industries, Inc. dated May, 1997.
Derwent Abstract No. 87–208842 to Asahi Chemical dated Jun., 1987.
Derwent Abstract No. 83–703548 to Asahi Chemical dated May, 1983.

Primary Examiner—P. Hampton-Hightower
Attorney, Agent, or Firm—Finnegan, Henderson, Farabow, Garrett & Dunner, L.L.P.

[57] ABSTRACT

There are disclosed a para-aramid shaped article having a density of 1.390–1.470/cm$^3$. The para-aramid has an inherent viscosity $\eta$inh of at least 3.5 and contains metal ions of 500 ppm or less, the metal ions being combined with acid end groups linked with the para-aramid molecules. The invention also relates to a process for preparing the same. Due to a reduced rate of moisture sorption, a reduced hygroscopic expansion coefficient and excellent mechanical properties, the para-aramid of the present shaped article is suitable for use for reinforcing fiber materials for a composite material and for a magnetic recording medium.

10 Claims, No Drawings

PARA-ORIENTED AROMATIC POLYAMIDE SHAPED ARTICLES AND PREPARATION THEREOF

FIELD OF THE INVENTION

This invention relates to a shaped article made of a para-oriented aromatic polyamide (hereinafter called "para-aramid") of which a representative material is poly(para-phenyleneterephthalamide) (hereinafter called "PPTA") and the preparation thereof, and it particularly relates to para-aramid shaped articles having improved hygroscopic properties and the preparation of the same.

BACKGROUND OF THE INVENTION

A para-aramid is a polymeric material with excellent crystallinity and excellent resistance to heat. Preparations of para-aramid and PPTA films are disclosed PPTA films in U.S. Pat. No. 4,857,255 and U.S. Pat. No. 4,752,643, and para-aramid films composed of a para-aramid consisting of aromatic rings having a nuclear substituting radical are disclosed in Japanese Unexamined Patent Publications No. 58-42649, No. 59-45124, and No. 62-70421.

In the meantime, there are proposed preparations of para-aramid fibers in U.S. Pat. No. 3,819,587, No. 3,767,756, No. 3,869,429, No. 4,016,236, No. 4,419,317, and No. 4,374,978. These known para-aramid shaped articles have generally excellent mechanical properties and heat resistance properties. Accordingly, applications of the shaped articles have been attempted in various fields of use. It has been a problem, however, that para-aramid shaped articles exhibit a great moisture absorption and a high hygroscopic expansion coefficient. A para-aramid shaped article tends to suffer a dimensional change due to moisture absorption (hygroscopic absorption). Problems are encountered in various applications of the shaped articles; for example, a composite material made of PPTA fiber will exhibit crack formation, which results from a repetition of moisture absorption-desorption cycles, and applications of the film as a high-density magnetic recording medium, high-density printed circuit, or the like, will exhibit problems, because the film is required to exhibit dimensional stability.

There have been proposed attempts to obtain PPTA films having improved hygroscopic properties by promoting orientation and crystallization of PPTA by means of extensive heat treatment and/or stretching in Japanese Unexamined Patent Publications No. 62-246719 and No. 6-136156. In Japanese Unexamined Patent Publication No. 62-246719, for example, a process for preparing a film is described where a raw film obtained through coagulation and washing is treated by heating under tension at 300°–500° C. Although application of heat-treatment at high temperature in the known processes can produce films having a low coefficient of hygroscopic expansion, the heat treated films have excessively reduced elongation and tend to become brittle. Satisfactory improvement of films in hygroscopic expansion coefficient cannot be obtained by these known processes when elongation of the films must be maintained at a desired level.

In order to prevent deterioration of the mechanical properties of film during heat-treatment, an acid component contained in a shaped article after coagulation should be removed as completely as possible, not only in the case where a film is cast directly from a polymerization reaction mixture obtained by polymerizing a diacid chloride with a diamine, but also in the case where a film is cast from a dope prepared by dissolving a polymer separated from the reaction mixture in a strong inorganic acid, such as concentrated sulfuric acid. It is noted that satisfactory removal of an acid component in a shaped article cannot be successfully accomplished only by conventional washing with water or warm water. In Japanese Unexamined Patent Publication No. 50-102650, for an example, there is described a preparation of a film containing 500 ppm or less of an ionic inorganic compound by washing. However, deterioration of the mechanical properties of the film tends to occur when heat is applied to the film during film making or in the event of application, since a minute amount of acid, either derived from the acid generated during polymerization or introduced into a dope for casting as a solvent, is difficult to remove even by this process.

In Japanese Unexamined Patent Publication No. 62-134229, a method of washing a coagulated film with water for effective removal of an acid component is described in which the coagulated film is washed after it has been neutralized by aqueous alkaline solution. In a process for producing fiber, a similar method is proposed in Japanese Unexamined Patent Publication No. 58-91809, in which PPTA fibers as spun from a concentrated sulfuric acid dope are piled up on a net conveyor while the fibers are neutralized before they are washed with a low-ion concentration water.

As explained above, in a process for making a para-aramid shaped article having an improved hygroscopic property by enhancing the crystallinity of the para-aramid by heat treatment, generally, a strong acid component, such as sulfuric acid or hydrochloric acid, generated during polymerization of the para-aramid or introduced into a dope for casting, is completely removed by neutralizing with an aqueous alkaline solution, and then the salt formed by the neutralization is washed off.

In the meantime, para-aramid prepared by conventional polymerization contains a carboxyl end group which is derived from the monomeric aromatic dicarboxylic acid, and further it sometimes contains a sulfonic group as a substituent of a benzene ring in the case where a shaped article is cast from a concentrated sulfuric acid solution. These acid groups (alkali reactive groups) turn into salt forms with alkali metals combined at their ends when they are neutralized in an aqueous alkaline solution. Since the salts are stable in the vicinity of neutrality, the metal ion combined with the end groups cannot be removed by washing in water after a neutralizing step. Accordingly, a para-aramid shaped article, prepared by casting which involves conventional neutralization by an alkali, contains a metal ion combined with the acid end group. A content of the acid end group varies with a feed ratio of monomer in the polymerization; in the case of a carboxyl group, the content is normally 40–80 meq/Kg, and in the case of a sulfonic group, the content is 0–10 meq/Kg. Therefore, in the case where the acid end groups are combined with an alkali metal, for example sodium, metal ions (sodium ions) by weight are contained in an amount of from about 1000 ppm to about 2000 ppm.

In the prior art technique, no attention has been paid to the influence of a relatively minute amount of metal ions combined with the acid end groups on an improvement in hygroscopic properties of a para-aramid shaped article. This is because the influence of the presence of a relatively minute amount of combined metal ion on the hygroscopic properties of a para-aramid shaped article has not been appreciated and because no efficacious method of extracting the combined metal ion contained in para-aramid has been available in the art.

Regarding removal of the contaminant, Japanese Unexamined Patent Publication No. 62-115036 proposes a process for preparing PPTA film in which the film is, after being neutralized, washed or rinsed in warm water in the presence of ultrasonic irradiation (ultrasonic cleaning).

This known washing method can remove metal ions and counter-ions of inorganic salts and alkaline compounds included in a shaped article, but it cannot remove the metal ions combined by ionic bonds with acid groups, such as the carboxyl end group or the like. Accordingly, the method cannot improve the hygroscopic properties of para-aramid shaped articles. A similar result is obtained in the case where a polymerization reaction mixture is supplied after being neutralized for film casting.

As explained above, a para-aramid shaped article having a sufficiently improved hygroscopic expansion coefficient, while maintaining excellent mechanical characteristics of the shaped article, is yet unknown.

As explained above, a para-aramid shaped article according to the prior art, though being excellent in mechanical characteristics and heat durability, exhibits a large hygroscopic absorption (moisture absorption) as well as a high hygroscopic expansion coefficient. A para-aramid shaped article is liable to give rise to dimensional change by moisture absorption, and in its use, this dimensional change invites problems in applications where dimensional stability of the shaped article is required.

Accordingly, the present invention provides a para-aramid shaped article in which moisture absorption and the hygroscopic expansion coefficients are improved without losing its excellent mechanical properties, and a process for preparing the same.

SUMMARY OF THE INVENTION

With an aim to obtain a para-aramid shaped article in line with the above object, the present inventors have applied their effort to find the following novel technical knowledge.

Namely, the content of metal ions in a product film can be surprisingly reduced when the film is rinsed with water after the coagulated film is treated with an aqueous carbon dioxide solution in a preparation of PPTA film from concentrated sulfuric acid solution in which the coagulated film is treated with an aqueous alkaline solution for promotion of removal of the acid.

It is believed that the removal of metal ion is effected by an aqueous carbon dioxide solution acting as an acid which dissociates the metal ion combined with the acid group combined with the PPTA molecule.

It has been discovered that a PPTA film of high Young's modulus, tensile elongation and strength with a reduced hygroscopic expansion coefficient and lowered moisture absorption can be prepared by subjecting a PPTA film containing metal ions in a specific content range to heat treatment so that a density of the film is adjusted in a specific range. Based on the discovery explained above, the present inventors have reached the present invention through extensive work.

Namely, one aspect of the present invention provides a para-aramid shaped article comprising substantially a para-aramid having an inherent viscosity of at least 3.5 in which the content of combined metal ions to acid groups connected with the para-aramid molecule thereof is in a range from 10 ppm and 500 ppm and having a density of from 1.390 g/cm³ to 1.470 g/cm³.

Another aspect of the present invention provides a method of producing a shaped article from a solution containing a para-aramid which comprises a series of steps including neutralizing an acid component contained therein, washing and treating the shaped article with an aqueous solution of 0.001% or more of carbon dioxide by weight, and optionally followed by washing in water either before shaping or after drying the shaped article, and treating the shaped article with heat at a temperature of 350° C.–500° C.

In the present invention, the term "shaped article" includes fibers such as filamentary yarn, staple fibers and nonwoven web, pulp-like grain and film or the like.

The para-aramid as used in the present invention is composed substantially of constituent units selected from the group of the following recurring units:

—NH—Ar$_1$—NH—    (1)

—CO—Ar$_2$—CO—    (2)

—NH—Ar$_3$—CO—    (3)

wherein Ar$_1$, Ar$_2$ and Ar$_3$ represent a para-oriented bifunctional radical containing at least one aromatic ring nucleus respectively, and (1) and (2) are equi-molar when they are included in a polymer. "Para-oriented" means either that the directions of main chain linkages in an aromatic ring are in the para-position, or that the directions of main chain linkages at both ends in a group containing at least 2 aromatic rings are parallel or in a common axis. The following are examples of these aromatic groups:

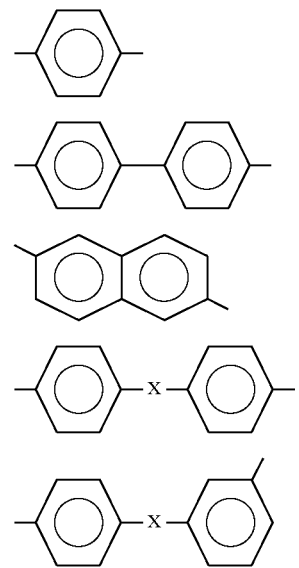

Here, X is a group selected from —O—, —CH$_2$—, —SO$_2$—, —S— and —CO—, and some of the hydrogen in these aromatic rings may be substituted by a halogen, nitro, sulfone, alkyl, alkoxy group or the like. Ar$_1$, Ar$_2$ and Ar$_3$ may be either two species or more, identical to each other, or different species.

In the present invention, a para-aramid can be prepared by any known process by diamine, dicarboxylic acid and amino-carboxylic acid which correspond to each of the aforementioned recurring units. For example, use is made of a process of reacting an amino group with a carboxylic acid group that is in a form of a derivative, for example an acid halide, acid imidazolide or ester. Polymerization may be any of low temperature solution polymerization, interfacial polymerization, melt polymerization or solid state polymerization.

The para-aramid which is used in the present invention may be a copolymer containing a group unit other than the one stated above in 10 mole %, or less, and the para-aramid may also contain another blended polymer. Typical examples of para-aramids which may be used in the present invention, are PPTA, chloro-substituted PPTA and poly (para-benzamide), and the most preferred is PPTA.

The polymer of the invention is chosen from a polymer having an inherent viscosity $\eta_{inh}$ (as determined at 30° C. on a solution of 0.2 g of the polymer in 100 ml of 98% sulfuric acid), in terms of which a degree of polymerization is given, of 3.5 or more, and preferably 4.5 or more. A polymer having too low a degree of polymerization cannot produce a shaped article exhibiting the desirable mechanical properties. From a point of view of a process of making a shaped article, a polymer having an inherent viscosity of 8.0 or less is chosen in most cases.

It is necessary that a shaped article of the present invention contain from 10 ppm to 500 ppm of metal ions which are combined with an acid group, for example a carboxyl end group, linked with the para-aramid molecule. The acid group combined with the para-aramid molecule includes a carboxyl end group of the para-aramid and a sulfonic group which is formed on a benzene ring as a nucleus substituting group when a shaped article is shaped from a sulfuric acid solution. A content of the metal ion is preferably 200 ppm or less, and more preferably 100 ppm or less. The metal ion herein mentioned includes alkali metals, for example lithium, sodium and potassium and alkaline earth metals, for example calcium and magnesium. When more than two metal ions are contained, the total of each metal content is given. A para-aramid shaped article having a metal ion content exceeding 500 ppm cannot exhibit the advantageous merit of the present invention since it exhibits a greater hygroscopic expansion by which a dimensional change of the shaped article tends to result. In this connection, a content of 500 ppm of metal ion corresponds to 30% of ionically combined metal ions bonded to the acid group linked with the PPTA molecule in the case where a film is produced from a PPTA having an inherent viscosity $\eta_{inh}$ of 6. Namely, nearly all of the metal ions combined with acid groups are extracted by the present invention.

Additionally, there is encountered a problem of heat resistance characteristics, for example a reduction of physical properties, in the case where a shaped article contains less than 10 ppm of metal ion. This is because a film containing metal ions in such a small amount retains a residual strong acid component introduced either from the acid produced in the polymerization or acid employed in casting. It is believed that the residual acid will promote deterioration of the para-aramid shaped article when the shaped article is treated by heat.

In the present invention, the measurement of "metal ions combined with acid groups linked with polymer" was performed by means of an ultimate analysis using, for example, plasma emission spectrochemical analysis. It is necessary that coincident ions, such as alkali compounds used in the neutralization treatment, and salts produced by the reaction of inorganic acid with the alkali compound, should be discriminated from metal ions combined with acid groups linked with polymer. These coincident metal ions can be separated from one another by removing together with counter-ions by extraction by boiling a shaped article in water prepared by boiling off carbon dioxide.

A shaped article of the present invention has generally a density of 1.390–1.470 g/cm³. A value of the density is measured by means of a density gradient tube method using a carbon tetrachloride-toluene system at 30° C. A preferred range of density varies with the form of the shaped article. For example, a density smaller than 1.390 g/cm³ in the case of a planar oriented film, and a density smaller than 1.430 g/cm³ in the case of an uniaxially oriented fiber cannot have a sufficiently reduced hygroscopic expansion coefficient. In the meantime, mechanical properties tend to be deteriorated at a density exceeding 1.420 g/cm³ in the case of a film and at a density exceeding 1.470 g/cm³ in the case of a fiber.

Referring to the hygroscopic expansion coefficient of the present invention, although the coefficient of PPTA film, taken by way of exemplary explanation, varies with, for example, the content of metal ions, the density, and the stretching condition, a preferred range of the hygroscopic expansion coefficient of a film suitable for use is 35 ppm/% RH or less, and more preferably 30 ppm/% RH. A known PPTA film of which the hygroscopic expansion coefficient is 45 ppm/% RH, can be modified to a preferred range according to the present invention. The level of the hygroscopic expansion coefficient is generally greater than 5 ppm/% RH or more.

A film of the present invention has mechanical properties in which those of the known para-aramid film are not deteriorated and exhibits a Young's modulus of 600 kg/mm² or more in all directions, preferably 1000 kg/mm² or more in all directions. In a film having a Young's modulus of 2000 kg/mm², there are generally two known film types; one is called a "balanced type film" in which properties of the film are substantially identical in all planar directions, and the other is called a "tensilized film" in which properties are intentionally raised in a specific direction of the film. A film of the present invention can be any of these two types.

A film of the present invention has a tensile elongation of 15% or more, preferably 25% or more in all directions. A film having a tensile elongation of less than 15% tends to tear easily, and accordingly is not suited for practical use. A tensile elongation of the film does not, in general, exceed 60%, although the upper value of tensile elongation is not limitative.

In general, the thickness of the film of the present invention, though not limitative, ranges from 1 µm to 100 µm, preferably from 3 µm to 70 µm.

In the case where a shaped article is a fiber, mechanical properties are not deteriorated from those of the known para-aramid fiber. For example, a PPTA fiber prepared by spinning a liquid crystal dope by a dry-wet spinning system followed by washing in a manner according to a method described in U.S. Pat. No. 4,419,317, and subjected to an aqueous carbon dioxide solution treatment which is followed by drying and heat-treatment, has preferably a density of 1.430–1.470 g/cm³, a Young's modulus of 300 g/d or more, and a tensile elongation of 1.8% or more. The fiber has, in general, a moisture absorption of 0.5% or more and a Young's modulus of 3000 g/d or less. A fiber of the present invention has preferably a tensile elongation of 1.8% or more, more preferably 2.0% or more. When the tensile elongation of the fiber is less than 1.8%, the fiber has problems in use as a reinforcing fiber material, for example tire cord and composite materials, since the fiber tends to easily break when it is subjected to repeated cycles of compression and elongation. Although the upper value of tensile elongation of the fiber is not limitative, it is rare that the tensile elongation of a PPTA fiber exceeds 10%.

In the following, processes for producing para-aramid shaped articles are presented. In embodiments of the present invention, any known processes for preparing para-aramid shaped article can be optionally applied. Para-aramid shaped articles cannot be made by melt-shaping since the melting point of a para-aramid is high. In the case of para-aramid, for example a chloro-substituted PPTA, which is capable of being dissolved in an organic solvent, a polymerization reaction mixture with neutralized by-product hydrochloric acid is used as such for a dope, and the dope is used for shaping film or spinning fibers by application of wet-systems or dry/wet-systems. In the case of a PPTA which is hard to dissolve in an organic solvent, a dope for shaping is prepared by re-dissolving once isolated polymer in an inorganic strong acid, such as a concentrated sulfuric acid, and shaping by applying a wet shaping system. In a process for shaping PPTA or the like, it has been known that a fiber spun from a liquid crystal dope, even in a state of an as-spun fiber not yet stretched, exhibits an extremely high orientation giving rise to a high tenacity and high modulus. It is also very difficult to obtain a film having an isotropic property since a film obtained by coagulation directly from a liquid crystal dope exhibits a greater degree of an-isotropy with respect to its Young's modulus and tensile elongation. Accordingly, use is made of a film which is obtained, for example, by a process described in U.S. Pat. No. 4,752,643 in which a dope is extruded in a liquid crystal state and coagulated after the liquid crystal phase is transferred to an isotropic extrudate. A dope of the present invention can generally be incorporated with weighting agent or extender filler, de-lustering agent, lubricant, ultraviolet light stabilizer, heat stabilizer, anti-oxidant, pigments, dissolving auxiliary or the like.

The shaping of the dope is not specifically limited. For shaping fibers, a dope is introduced from a spinning die either directly into a coagulation bath or passed through air before being introduced into a coagulation bath, or introduced into a heated flow of air for evaporation of the solvent constituting the dope to coagulate. There is also a shaping process for producing pulp-like in which a dope is introduced directly into a coagulation bath having a high shearing force.

For shaping film, a dope is either extruded directly into a coagulation bath or cast on an endless belt, or coated on an endless belt by a doctor knife or the like means, and thereafter either the solvent of the dope is evaporated from the dope on the belt, or the cast dope is introduced together with the belt conveyor into a coagulation bath for a wet coagulation system.

After shaping is performed by spinning, film-casting, or the like as aforesaid, the shaped article is treated with an aqueous carbon dioxide solution characterized by the present invention after the shaped article is washed by water and is brought to a neutralization treatment if acid is produced in polymerization or if acid used in dissolving remains, and washed if needed. If acid is contained in a shaped article, the mechanical properties of the shaped article are deteriorated in the course of drying and heat treatment. For this reason, removal of the acid is needed, in the case where shaping is performed using a polymerization reaction product as the dope, either before the shaping process is carried out or before a step where a shaped article is dried after it is shaped, and in the case where shaping is performed with use of a dope prepared by using an inorganic acid such as sulfuric acid or the like, before a step where the shaped article is dried after it is shaped.

In this situation, it is practically difficult to attain the entire removal of the acid component by a mere application of washing of the shaped article containing the acid component as it is shaped because a prolonged time is inevitably required for the washing due to the presence of the affinity between the amide linkage and the acid component. Accordingly, it is necessary that a shaped article be washed after it is neutralized by alkali.

As an alkali for the neutralization, lithium hydroxide, sodium hydroxide, potassium hydroxide, lithium carbonate, sodium carbonate, and sodium bicarbonate or the like can be used.

A shaped article obtained after neutralization contains excess alkali and inorganic salt, for example sodium sulfate or the like, which is a reaction product of the alkali with the acid component included in the shaped article before neutralization. These contaminants should be removed by washing. As washing liquid used after neutralization, water at room temperature can be used. The washing can be carried out under ultrasonic irradiation and/or low frequency vibration in combination.

With application of the aforesaid washing, free metal ions can be considerably removed. It is, however, difficult for any known method of washing, such as washing with water or warm water and ultrasonic wave washing or the like, to bring the gross content of metal ions in a shaped article to a level lower than 1000–2000 ppm. Namely, what can be removed or extracted by washing after the neutralization are the metal salts or alkaline compounds contained in a shaped article, and it is believed that metal ions combined with acid groups linked with polymer molecules cannot be removed by washing after neutralization.

In order to produce a shaped article containing a reduced amount of combined metal ions with acid groups linked with polymer molecules, which are impossible to remove or extract, the shaped article should be treated with an aqueous carbon dioxide solution at a concentration of carbon dioxide of 0.001% or more by weight, which characterizes the present invention. An aqueous carbon dioxide solution at a concentration of carbon dioxide of 0.001% or more by weight can be prepared either by bubbling carbon dioxide gas in water, by forcing carbon dioxide gas to be absorbed by water, or by soaking or immersing a piece of dry ice in water. Since carbon dioxide is contained in atmospheric air, carbon dioxide can be dissolved at a concentration of 1 ppm, more or less at the maximum in normally available water. However, with use of an aqueous carbon dioxide solution containing carbon dioxide at such a low concentration, the ions can not be removed by washing in a practically reasonable time.

The upper limit of carbon dioxide concentration of an aqueous carbon dioxide solution is about 0.17% by weight, which corresponds to the saturated concentration at 1 atm. at 20° C., from which a suitable concentration may be chosen for a treatment process. A concentration of carbon dioxide of an aqueous carbon dioxide solution may be approximately determined based on a given pH of the solution. An aqueous carbon dioxide solution having a carbon dioxide concentration of 0.001% has a pH of 5 at a temperature in the vicinity of room temperature when the amount of other components in the solution is small.

For water for a preparation of an aqueous carbon dioxide solution in accordance with the present invention, use of water containing a small amount of metal ions is desirably made. Use of water having an evaporation residue of 50 ppm or less is preferred. More preferably, ion exchanged water can be used.

Removal of metal ions is preferably carried out so that a metal ion content of a shaped article becomes a level of 500 ppm or less, more preferably 300 ppm or less, or still more preferably 100 ppm or less.

Treatment of a shaped article (e.g., heating during drying) may not give rise to deterioration of a para-aramid if carbon dioxide is rapidly dissipated. If needed, the shaped article as it is treated may be washed before being dried. In this case, ion exchanged water is normally preferred as the washing liquid.

Methods of carrying out washing by water, neutralization, washing off, and treatment with an aqueous carbon dioxide solution which is characterized by the present invention are not specifically limitative.

A shaped article may be sprayed with each of the treating liquids while being passed continuously through a series of these steps, or it may be introduced into each of the treating liquids while being passed through a treating line. Alternatively, a shaped article may be wound separately in each of these separate treatments and rewound when being delivered to a respective subsequent treating step, or it may be soaked or dipped in each of these treating steps as it is wound.

For a process of producing fibers or pulp granules, it is suited that the shaped article is treated on a net by sprinkling an aqueous carbon dioxide solution in a shower over the net after neutralization and washing in a method in which the shaped article in the form of a yarn is accumulated in a pile on a net conveyor for a treatment as proposed in U.S. Pat. No. 4,016,236 and U.S. Pat. No. 4,374,978 or the like. In this method, the merit of the present invention can be easily obtained because washing of fibers is carried out on a net conveyor where the fibers contact the treatment liquid for a sufficient period of time.

The shaped article after washing by water is then dried. The shaped article may be stretched either before being dried, or simultaneously with drying or after being dried. Application of stretching is a preferred mode in order to improve the mechanical properties, particularly the Young's modulus of a shaped article.

Drying and heat treatment may be carried out keeping a shaped article either in a relaxed state, under constraint of shrinkage, or in a fixed or slightly extended length in accordance with the form of the shaped article and the intended properties of the shaped article. In the case where the shaped article is in the form of a film, for example, if a film having a tendency to shrink with removal of washing liquid (water for an example) is heat-treated without any restraint of its shrinkage, the resultant film will have a tendency to have reduced light transmittance, or to lose flatness, or to exhibit curling due to possible formation of non-uniformity of microstructure or non-uniformity of crystallization in the film. For a heat-treatment of film under constraint of shrinkage, heat treatment or drying can be performed with the film clamped or clipped by means of a clip tenter or metal frames.

In order to obtain an improved level of hygroscopic characteristics as intended by the present invention, it is necessary that crystallization should be promoted by application of heat-treatment. In carrying out a heat-treatment, conditions for heat-treatment such as temperature, period of the treatment, or the like, should be chosen so that a resultant shaped article has a density of from 1.390 g/cm$^3$ to 1.470 g/cm$^3$. For this purpose, a temperature for a heat treatment should be between 350° C. and 500° C., preferably between 400° C. and 450° C., and a preferred duration of a heat treatment is between 5 seconds and 10 minutes, more preferably between 10 to 60 seconds. Other conditions pertaining to this heat treatment are not specifically limited. Means or methods of heating may be optionally chosen from heated gas (air, nitrogen, argon or the like), air at room temperature, electric heater, use of radiant heat such as infra-red lamps, dielectric heating or the like.

In succession to the aforesaid heat treatment, if needed, a shaped article may be heat-treated under relaxation for removal of residual strain in the shaped article. The heat treatment under relaxation is a preferred embodiment for obtaining a final shaped article product having a reduced heat shrinkage as well as an enhanced dimensional stability. Conditions of heat-treatment under relaxation, although varied with the mode of residual strain intended to be removed, can be in a similar range independent of the conditions of the first heat treatment, and can be chosen from those disclosed for the first heat treatment.

BEST MODE FOR CARRYING OUT THE INVENTION

To provide an aid for better understanding of embodiments and advantageous merits of the present invention, examples are given, in the following, in which PPTA film and fiber are chosen as representative para-aramid and shaped articles. These examples are not intended to limit the scope of the present invention. It will be easily understood that advantageous merits of the present invention can be obtained in another para-aramid as well as another form of shaped article.

In the description of the following examples, parts and percent are all by weight unless particularly stated.

The inherent viscosity $\eta_{inh}$ was measured by a conventional manner at 30° C. by dissolving 0.2 g of a polymer in 100 ml of 98% sulfuric acid.

The viscosity of a dope was measured by a B type viscometer at a rotational speed of 0.5 r.p.m.

The thickness of a film was measured by a dial gauge having a measuring plane with a diameter of 2 mm.

Strength, elongation, and Young's modulus were measured by drawing load elongation curves for samples having a size of 200 mm×10 mm by means of a constant speed elongation type stress-strain measuring machine (Simazu Manufacturing Works DSS-500) with a measuring grip length of 100 mm and a drawing speed of 50 mm/min.

The hygroscopic expansion coefficient is obtained by calculation based on the measured value of dimensional change of a film sample of 50 mm×10 mm (measuring length is 40 mm). The film sample is dried at 200° C. for 2 hours to obtain a dried film. Immediately after the termination of the drying, the dried film was placed in an atmosphere adjusted at a temperature of 23° C. with a relative humidity of 55% to allow it to absorb moisture fully. The dimensional change of the film occurred during the time period starting from the end of drying to the time when it absorbed moisture fully. The measurement of dimensional change was carried out by using measuring microscope (available from OLYMPUS).

The rate of moisture sorption is defined as a equilibrium of moisture regain at 23° C. and a relative humidity of 55%.

In connection with the moisture absorption as mentioned above, it should be regarded that a para-aramid shaped article requires a longer time to reach moisture regain at equilibrium since the rate of moisture sorption is generally slow in many para-aramid shaped articles. When a treatment for moisture absorption is insufficiently carried out, apparent values obtained of both hygroscopic expansion coefficient and rate of moisture absorption will be small. Accordingly, there may be a danger of faulty evaluation of hygroscopic properties of a para-aramid shaped article. Although the time required for the full absorption of moisture varies depending upon thickness, size, and shape of a shaped article, in practice, properties of moisture absorption are first measured after the sample has been placed at least 48 hours in the above described atmosphere, and it should be confirmed that a value measured on a sample prepared by being placed in the atmosphere for another 24 hours remains unchanged. The value of moisture absorption of a shaped article should be the value obtained by measuring at a condition in which a measured value is constant on a sample prepared by being placed in the atmosphere for another 24 hours.

The density of a shaped article is measured at 30° C. by a density gradient tube method using a carbon tetrachloride-toluene system.

The dielectric break down voltage was measured by applying an alternating current at 60 HZ through an electrode having a diameter of 6 mm to a film sample having an area 100 mm×100 mm.

The measurement of the combined metal ions with acid groups bonded to polymer molecules is carried out on a sample prepared by boiling a shaped article in water using a pre-boiled ion exchanged water to remove metal ions which are removable by water. In the meantime, the combining ratio of metal ions to acid groups linked with polymer molecules was estimated by calculating a ratio of: (A) the amount of metal ions contained in a sample prepared by washing a sample of an undried shaped article taken out from a shaping process with a boiled ion exchanged water followed by drying to (B) the amount of metal ions contained in a shaped article obtained by the process of the present invention. The amount of contained metal ions was measured by an Inductively Coupled Plasma Emission Spectrochemical analyser (NIPPON Jarrell Ash ICAP-575- II).

REFERENCE EXAMPLE: PREPARATION OF PPTA

As explained in the following, PPTA was prepared by low temperature solution polymerization. In a polymerization apparatus as shown in Japanese Examined Patent Publication No. 53-43986, 70 parts of anhydrous lithium chloride were dissolved in 1000 parts of N-methylpyrrolidone and then 48.6 parts of p-phenylene diamine were dissolved therein. After cooling the solution to 8° C. , 91.4 parts of terephthaloyl dichloride were added in the form of a powder at one time. Several minutes later, the polymerization reaction product was solidified into a cheese-like state, and the polymerization product was discharged from the apparatus according to the method described in Japanese Examined Patent Publication No. 53-43986, and immediately transferred into a biaxial closed type kneader where the reaction product was finely pulverized. The pulverized fine powder was then transferred into a Henshel mixer and about an equal amount of water was added and followed by further crushing. The product was filtered, washed several times in warmed water and dried at 110° C. in hot air. 95 parts of a yellow colored polymer having an $\eta_{inh}$ of 6.1 were obtained. Polymers with a varied $\eta_{inh}$ can be obtained easily by varying the ratio of N-methylpyrrolidone to the monomer (p-phenylene diamine and terephthaloyldichloride) and/or the ratio between the monomers.

EXAMPLE 1

A dope having a polymer concentration of 12% was prepared by dissolving a PPTA having an $\eta_{inh}$ of 6.1 in sulfuric acid having a concentration of 99.5% at 60° C. Viscosity at 60° C. of the dope was found to be 4,600 poise. The dope exhibited optical anisotropy. The dope was deaerated under vacuum conditions while being kept at 60° C. The dope was then filtered and transported by a gear pump to a T die having a slit of 0.4 mm×700 mm through which the dope was extruded for casting a film. The extruded dope was cast on a mirror finished surface of a tantalum belt. Air with a relative humidity of about 25% at a temperature of about 120° C. was blown onto the cast, and the optically anisotropic dope film is subsequently converted into an optically isotropic dope film. The dope film is then introduced into 60% sulfuric acid solution at 20° C. for coagulation.

The coagulated film was then peeled off from the belt, passed through water at room temperature for 6 minutes, then passed through a 2% aqueous sodium dioxide solution for a period of 6 minutes, and further passed through water at room temperature for 6 minutes for washing, and then passed through an about 0.01% aqueous carbon dioxide solution (pH=4.5) for 12 minutes, and then finally passed through water at room temperature for a ten minute wash.

After washing, the obtained film was stretched 1.02 fold continuously by a roll stretching means along its length (hereinafter called the "MD direction") and then continuously stretched 1.10 fold transversely (the "TD direction") on a tenter and dried at 200° C. (with hot air) at constant length as clipped on the tenter, and further subjected to a heat treatment at 440° C. for 30 seconds at constant length with its ends being clipped on the tenter and trimmed at both ends by cutting to obtain a film having a thickness of 38 μm with 508 mm width on the roll. The obtained film contained sodium ions as metal ions of which the amount was 38 ppm. The characteristics of the film are tabulated in Table 1.

EXAMPLE 2

A film was prepared by the same process as Example 1. Stretching of the film in the MD and TD directions were 1.07 fold and 1.23 fold respectively, and hot plate heat treatment was carried out at 430° C. Withdrawal speed of the film was adjusted so that the product film had a thickness of 38 μm. The obtained film contained 40 ppm of sodium ions as the metal ion. The characteristics of the film are shown in Table 1.

COMPARATIVE EXAMPLE 1

A PPTA film was prepared by repeating the process in Example 1 except that the aqueous carbon dioxide solution treatment was eliminated. The obtained film contained 1300 ppm of sodium ions as metal ions. The characteristics of the film are shown in Table 1.

Referring to these examples, it appears that the process of the present invention can exceedingly reduce the amount of sodium ions, improves the moisture absorption characteristics, especially the hygroscopic expansion coefficient, and the break-down voltage.

EXAMPLES 3–5 AND COMPARATIVE EXAMPLES 2–5

In the preparation process in Example 1, a coagulated PPTA film was peeled off the belt and taken out for carrying out the following experiments. Films having a size of 14 cm×28 cm were taken out. After the sample films are subjected to the foregoing respective different treatments including, for example washing, the films were cramped between stainless steel frames to prevent shrinkage, dried in a heated air oven at 200° C. and then heat-treated for a minute in a heated air oven at 400° C.

As Comparative Example 2, the sample film was washed in flowing water at 10° C. for 15 minutes and then subjected to neutralization treatment for 5 minutes in 1% aqueous sodium hydroxide solution at 10° C. and finally washed for 10 minutes in flowing water at 10° C.

As Comparative Example 3, a film obtained in Comparative Example 2 was washed further, in accordance with a method described in Japanese Unexamined Patent Publication No. 62-115036. The film was washed in warm water at 55° C. for 30 minutes under irradiation of ultrasonic vibration while the warm water was being replaced.

As Comparative Example 4, Comparative Example 2 was repeated completely except that the neutralization treatment was eliminated.

As Comparative Example 5, in place of the washing and neutralization treatment in Comparative Example 2, a film was washed for 24 hours with use of a highly purified water which was deionized by an ion exchange resin.

As Examples 3 and 4, a PPTA film prepared by washing, neutralization and washing according to Comparative Example 2 was soaked in 0.01% aqueous carbon dioxide solution (pH=4.5) for 1 and 24 hours respectively, and then washed in a flow of water at 10° C.

As Example 5, a PPTA film as washed with hot water in Comparative Example 3 was treated further by soaking in 0.01 aqueous carbon dioxide solution (pH=4.5) for 3 minutes, and then washed in a flow of water at 10° C. for 3 minutes. The characteristics of these obtained films are shown in Table 2.

The film obtained according to a known process in Comparative Example 2, retains 1310 ppm of Na ion. It can be seen that little reduction in Na ion is attained since the Na ion content is 1280 ppm for the film which was prepared by a method in which the film of Comparative Example 2 was further washed according to a method described in Japanese Unexamined Patent Publication No. 62-115036. In this connection, reference is made to the fact that an Na ion content of 45 ppm is attained in Example 5.

In the meanwhile, the films of Comparative Examples 4 and 5, in which the neutralization was eliminated, have an Na ion content of 8 ppm or less, but in spite of that, reduction of the tensile elongation of the films is remarkable, and the films become brittle.

Regarding the film of Comparative Example 3, assuming that Na ions are substantially the only metal ions combined with acid groups linked with the PPTA molecules, it is estimated from a calculation based on the amount of Na ions of Comparative Example 3 and the Na ions of Examples 1–3, that about 96–97% of the Na ions combined with acid groups linked with the polymer molecules were supposed to be removed by an aqueous carbon dioxide solution treatment.

EXAMPLES 6 AND COMPARATIVE EXAMPLE 6

A PPTA fiber was prepared according to a process described in Japanese Unexamined Patent Publication No. 58-91809.

The PPTA as used in Example 1 was dissolved in a 99.4% sulfuric acid so that a dope having a polymer concentration of 18.5% was obtained. The dope was extruded from a spinneret with 100 orifices, having diameters of 0.06 mm, to the air. The extrudate was then passed through an air gap of 7 mm in length and introduced into diluted sulfuric acid having a concentration of 20% at 5° C. for coagulation. The coagulated yarn was accumulated on a net conveyor where the yarn was sprayed with soft water for one minute for a preliminary washing and then sprayed with 0.5% sodium hydroxide aqueous solution for a period of 2 minutes for neutralization treatment. The neutralized yarn was then sprayed with soft water for washing for 2 minutes, was sprayed with 0.001% aqueous carbon dioxide solution (pH= 5.0) for 5 minutes, and washed with soft water for 2 minutes. The washed yarn was then dried by an air flow at 130° C., and the dried yarn was finally heat-treated by an air flow at 350° C. for a period of 4 minutes before the final PPTA yarn was taken up by winding. The obtained fiber contained 100 ppm of Na ion as the metal ion.

For the sake of comparison, another PPTA fiber was produced in the same way and manner as the above except that the aqueous carbon dioxide solution treatment was totally eliminated. The fiber contained 1500 ppm of Na ion. The characteristics of these fibers are shown in Table 3.

EXAMPLE 7 AND COMPARATIVE EXAMPLE 7

In accordance with the disclosure of U.S. Pat. No. 4,374, 978, and in the similar manner as in Example 6 and Comparative Example 6, PPTA fibers were spun and passed through a series of treatments steps including washing, and the dried PPTA fibers were taken out of the conveyor for heat treatment. The heat treatment was carried out in a nitrogen atmosphere in which the dried fibers were heated on a heated plate at 400° C. for 8 seconds under a tension of 1.5/d. The heat-treated yarns were taken up by winding to obtain PPTA fibers of Example 7 and Comparative Example 7. The characteristics of these fibers are shown in Table 3.

It can be seen that the fiber of the present invention has a reduced content of Na and a reduced moisture absorption with no deterioration of fiber qualities such as tenacity and Young's modulus in relation to those of Comparative Example 7.

INDUSTRIAL APPLICABILITY

The shaped article of the present invention exhibits a reduced rate of moisture absorption, a reduced hygroscopic expansion coefficient pertaining to a reduced dimensional change in the event of moisture absorption, and in spite of these favorable properties, it still maintains the excellent mechanical properties which are innate to a para-aramid shaped article. Other advantageous merits of reduced metal ion containment in combination with reduced moisture absorption include an improved electric insulation and less corrosiveness to metal film formed on the surface of a para-aramid shaped article of which use is made, for example in a metal film electric circuit. In this case, accidental incidence of electrolysis of metal film circuits by electric current leakage in the circuit will be reduced because corrosion of the metal film can be prevented.

Since a shaped article of the present invention does not contain any blended additive other than para-aramid for the improvement of hygroscopic properties, the shaped article retains resistance to heat and durability to solvents which are inherent in the para-aramid. The improved properties attained by the invention cannot be deteriorated even after the shaped article is subjected to a heat treatment.

With an improvement in hygroscopic properties, in the use of para-aramid fibers for reinforcing fiber material for making a fiber reinforced composite material, the problematic generation of cracks which is caused by temperature and moisture change in the atmosphere can be eliminated or minimized with use of the present para-aramid shaped article. In the use of film, the present para-aramid enhances reliable serviceability in the use of a high density magnetic recording medium due to the improved hygroscopic properties. The present para-aramid film allows manufacture of high density wiring in printed circuit film or printed circuit plate.

In use of para-aramid film as a base film for forming a filmed metal by a chemical vapor deposition technique or a sputtering technique, the present para-aramid film can be advantageously used because reduction of curl formation as well as a reduced deterioration of the metal film is attained by a film of the present para-aramid film. Accordingly, the film of the invention can extend its field of use to applications covering magnetic tapes, flexible print wiring bases, film-like bases for solar batteries, or the like.

With its improved electrical insulation, a para-aramid shaped article of the present invention can be used as an insulation material for electrical and electronic appliances.

TABLE 1

|  | NaOH aqueous solution neutralization | Aqueous carbon dioxide solution | Amount of Na (ppm) | Density (g/cm$^3$) | Tenacity (kg/mm$^2$) MD | Tenacity (kg/mm$^2$) TD | Elongation (%) MD | Elongation (%) TD | Young's modulus (kg/mm$^2$) MD | Young's modulus (kg/mm$^2$) TD | Hygroscopic expansion coefficient (ppm/% RH) MD | Hygroscopic expansion coefficient (ppm/% RH) TD | Moisture absorption (%) | Breakdown voltage (kV/mm) |
|---|---|---|---|---|---|---|---|---|---|---|---|---|---|---|
| Example 1 | done | done | 38 | 1.416 | 40 | 39 | 28 | 31 | 1180 | 1130 | 28 | 31 | 2.9 | 192 |
| Example 2 | done | done | 40 | 1.410 | 44 | 42 | 27 | 28 | 1319 | 1222 | 24 | 30 | 3.0 | 196 |
| Comparative Example 1 | done | none | 1300 | 1.419 | 43 | 38 | 27 | 26 | 1164 | 1221 | 43 | 38 | 3.3 | 157 |

*All the film have a thickness of 38 micron.

TABLE 2

|  | NaOH aqueous solution | Aqueous carbon dioxide solution treatment | Amount of Na (ppm) | Density (g/cm$^3$) | Tenacity (kg/mm$^2$) | Elongation (%) | Young's modulus (kg/mm$^2$) | Hygroscopic expansion coefficient (ppm/% RH) | Moisture absorption (%) |
|---|---|---|---|---|---|---|---|---|---|
| Example 3 | done | done | 023 | 1.413 | 37 | 27 | 1150 | 32 | 3.0 |
| Example 4 | done | done | 11 | 1.415 | 38 | 16 | 1160 | 29 | 2.9 |
| Example 5 | done | done | 45 | 1.411 | 41 | 35 | 1166 | 29 | 2.9 |
| Comparative Example 2 | done | none | 1310 | 1.406 | 40 | 46 | 1176 | 41 | 3.8 |
| Comparative Example 3 | done | none | 1280 | 1.406 | 41 | 47 | 1190 | 40 | 3.7 |
| Comparative Example 4 | none | none | 8 | 1.409 | 32 | 8 | 1165 | 32 | 3.0 |
| Comparative Example 5 | none | none | <1 | 1.412 | 32 | 7 | 1153 | 30 | 2.9 |

*All the films have a thickness of 43 micron.
*Tensile properties are measured in the direction of MD.

TABLE 3

|  | Aqueous carbon dioxide solution treatment | Amount of Na (ppm) | Yarn size in denier | Tenacity (q/d) | Elongation (%) | Young's modulus (g/d) | Moisture absorption (%) |
|---|---|---|---|---|---|---|---|
| Example 6 | done | 100 | 150 | 24.1 | 4.8 | 410 | 2.5 |
| Comparative Example 6 | none | 1500 | 150 | 24.0 | 4.8 | 412 | 3.8 |
| Example 7 | done | 103 | 147 | 22.0 | 1.9 | 905 | 2.3 |
| Comparative Example 7 | none | 1490 | 147 | 22.2 | 1.9 | 907 | 3.3 |

We claim:

1. A para-oriented aromatic polyamide shaped article having a density of from 1.390 g/cm$^3$ to 1.470 g/cm$^3$, comprising: a para-oriented aromatic polyamide having an inherent viscosity of 3.5 or more and bonded metal ions from 10 ppm to 500 ppm which bond with acid groups linked with the aromatic polyamide molecules, the inherent viscosity being measured at 30° C. by dissolving 0.2 grams of the polyamide in 100 ml of 98% sulfuric acid.

2. A para-oriented aromatic polyamide shaped article as claimed in claim 1, wherein said article is a fiber, a film, or a pulp granule.

3. A para-oriented aromatic polyamide shaped article as claimed in claim 1, wherein said article comprises a polyparaphenyleneterephthalamide in the form of a film.

4. A para-oriented aromatic polyamide shaped article as claimed in claim 1, wherein the para-oriented aromatic polyamide is a polyparaphenyleneterephthalamide in the form of a fiber.

5. A para-oriented aromatic polyamide shaped article as claimed in claim 1, wherein said para-oriented aromatic polyamide shaped article is a film having a density of from 1.390 g/cm$^3$ to 1.420 g/cm$^3$, a hygroscopic expansion coefficient of 35 ppm/% RH or less, a Young's modulus in all directions of film of 600 kg/mm$^2$ or more, and an elongation of 15% or more.

6. A para-oriented aromatic polyamide shaped article as claimed in claim 1, wherein said para-oriented aromatic polyamide shaped article is a fiber having a density of from 1.430 g/cm$^3$ to 1.470 g/cm$^3$, a moisture sorption ratio of 2.7% or less, a Young's modulus of 300 kg/mm$^2$ or more, and an elongation of 1.8% or more.

7. A para-oriented aromatic polyamide shaped article as claimed in claim 5, wherein the para-oriented aromatic polyamide is a polyparaphenyleneterephthalamide.

8. A para-oriented aromatic polyamide shaped article as claimed in claim 6, wherein the para-oriented aromatic polyamide is a polyparaphenyleneterephthalamide.

9. A process for producing a para-oriented aromatic polyamide shaped article from a solution of a para-oriented aromatic polyamide, comprising: after forming the shaped article, neutralizing an acid component contained in the shaped article; washing the shaped article; treating the shaped article with an aqueous carbon dioxide solution having a carbon dioxide concentration of 0.001% or more; drying the shaped article; and heat-treating the shaped article at 350° C.–500° C.

10. A process for producing a para-oriented aromatic polyamide shaped article from a solution of a para-oriented aromatic polyamide, comprising: neutralizing a by-produced acid component contained in the solution before said polyamide is shaped; treating the polyamide shaped article with an aqueous carbon dioxide solution at a carbon dioxide concentration of 0.001% or more; drying the shaped article; and thereafter heat-treating the shaped article at 350° C.–500° C.

* * * * *